United States Patent [19]
Durand

[11] 3,851,539
[45] Dec. 3, 1974

[54] WORM REDUCTION GEARING DRIVE

[76] Inventor: François Durand, 108, Boulevard Carnot, 78 Le Vesinet (Yvelines), France

[22] Filed: Aug. 28, 1973

[21] Appl. No.: 392,185

[30] Foreign Application Priority Data
Sept. 7, 1972  France.............................. 72.31831

[52] U.S. Cl. ................................................ 74/425
[51] Int. Cl. ............................................. F16h 1/16
[58] Field of Search ...................................... 74/425

[56] References Cited
UNITED STATES PATENTS

| | | | |
|---|---|---|---|
| 707,095 | 8/1902 | Fox et al. ............................... | 74/425 |
| 2,863,325 | 12/1958 | Eisenberg et al. ..................... | 74/425 |
| 3,241,682 | 3/1966 | Cookney et al...................... | 74/425 X |

*Primary Examiner*—Leonard H. Gerin
*Attorney, Agent, or Firm*—Michael S. Striker

[57] ABSTRACT

This worm gear device is intended for driving an output shaft at a relatively low speed while reducing very considerably the radial stress due to teeth meshing reactions in order to preserve a maximum capacity of the driven shaft bearings and absorb stress due to the flexion moments applied to the driven shaft. It comprises a main reduction gearing with two diametrally opposed driving worms both meshing with the single driven wheel and each driven in turn by a primary reduction worm gearing having its driven wheel coupled to the shaft of the corresponding worm of the main reduction gearing, the cases of said two primary worm gearings being mounted for free movement but interconnected by a reaction bar pivoted at its end, the input shafts of the two primary reduction gearings being furthermore interconnected by coupling means capable of accomodating a relative angular misalignment between these two shafts.

4 Claims, 7 Drawing Figures

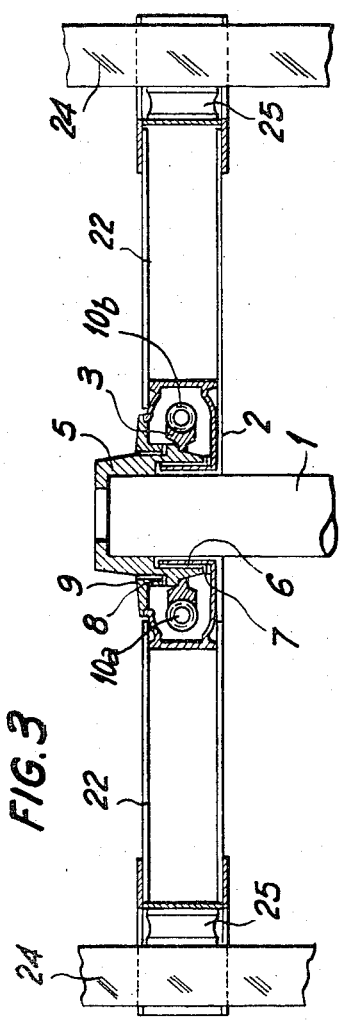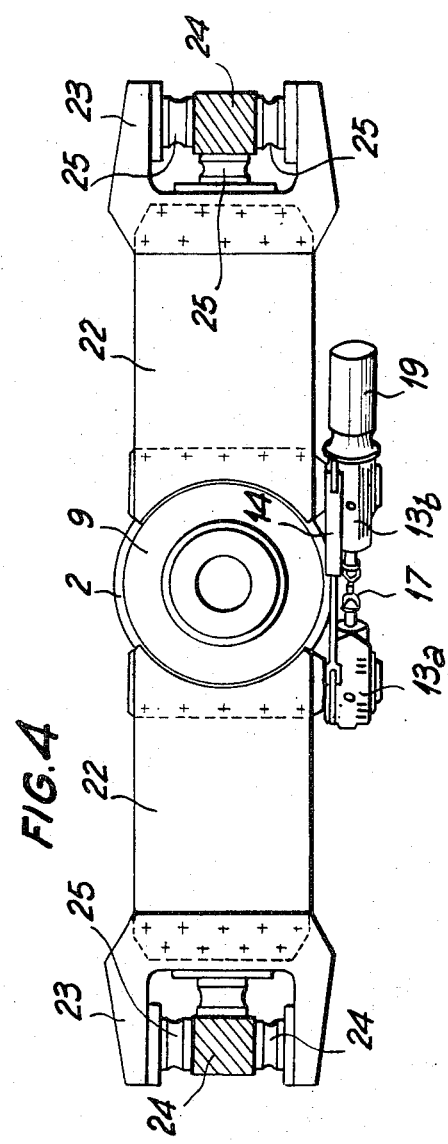

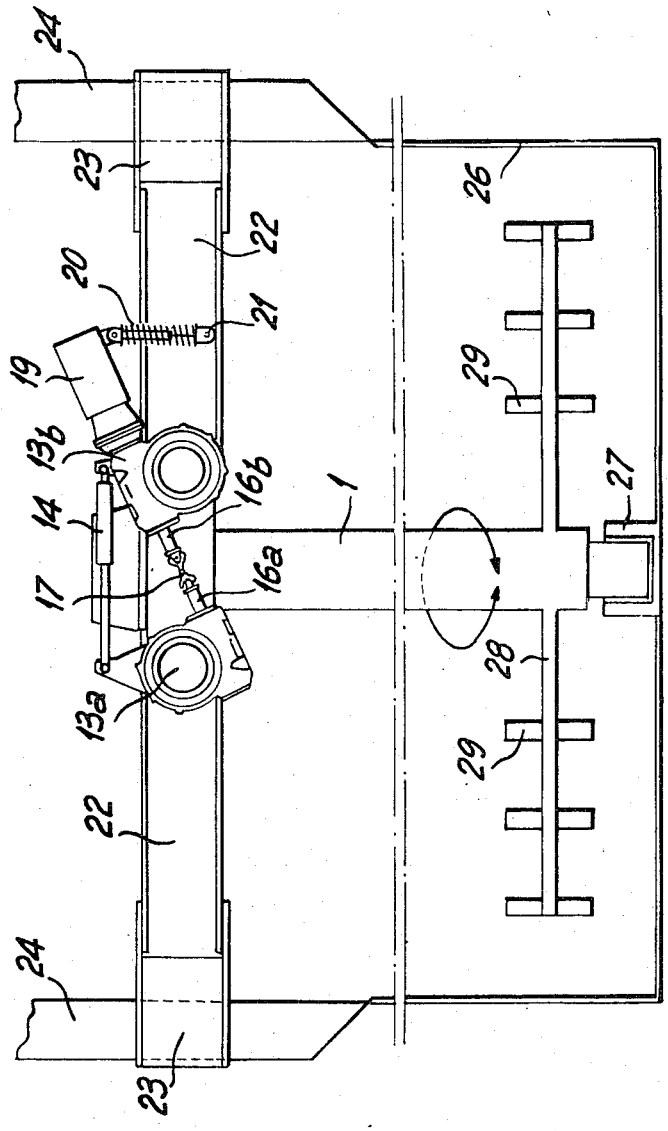

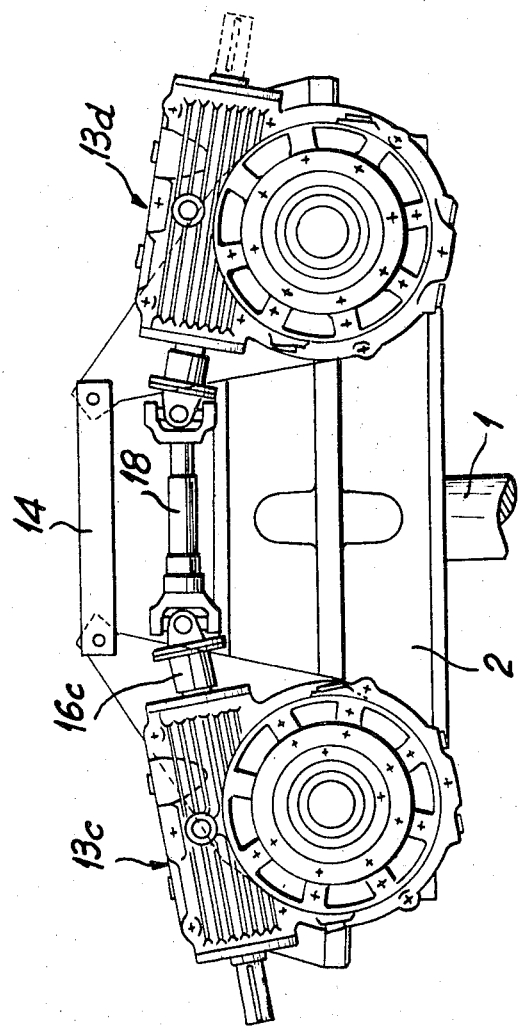

WORM REDUCTION GEARING DRIVE

The present invention relates to drive means comprising a worm gearing adapted to cause a driven shaft to rotate relatively slowly while acting on the other hand as a bearing to this shaft.

Many ways of mounting a worm reduction gearing having this twofold function have already been proposed. However, the stress due to flexion in the driven shaft may give rise to detrimental radial reactions in the bearings of the "slow" shaft of the worm reduction gearing. Now, according to their directions, these reactions may add themselves to the radial stress exerted on the bearings of the slow shaft of the reduction gearing.

It is therefore the primary object of the present invention to provide a worm gear arrangement capable of reducing very considerably the above-mentioned radial stress due to teeth meshing reactions in order to preserve a maximum capacity of the slow shaft bearings of the reduction gearing with a view to absorb the stress due to the flexion moments applied to the driven shaft.

To this end, the present driving device comprises a main reduction gearing with two diametrally opposed driving worms both meshing with the single driven wheel of the main reduction gearing.

However, this arrangement is characterised in that:
both driving worms are each driven in turn by a primary reduction worm gearing having its driven wheel coupled to the shaft of the corresponding worm of the main reduction gearing, on the other hand, the cases of these two primary reduction gearings are mounted for free movement but interconnected by a so-called "reaction tie-bar" pivoted at its ends, and the input shafts of these two primary reduction gearings are interconnected by coupling means capable of accomodating a relative angular misalignment between these two shafts.

With this arrangement, the stress to be exerted by two primary reduction gearings is distributed automatically among these gearings. The stress applied to the bearings of the slow shaft of the main reduction gearing, which is due to teeth meshing reactions, is balanced since the assembly comprises two diametrally opposed driving worms. Under these conditions, it is possible to reduce to a single bearing, disposed in the median plane of the crown wheel, the two bearings usually disposed on either side of this crown wheel. However, it is also possible to contemplate the mounting of said crown wheel on a thrust bearing which, in this case, cannot be disposed in the median plane of the whee; this thrust bearing may be provided with self-aligning rollers or balls. Since the reactions produced on the crown wheel, which are exerted in the direction of the wheel axis, have the same direction for both worms, the torques developing in the crown wheel as a consequence of the meshing efforts cancel each other. Under these conditions, only the corresponding axial bearing of the wheel is stressed by the meshing efforts. With worm gearings of the type comprising single or double threads, the axial stress is relatively moderate. Therefore, in the case of a driven shaft disposed vertically it is possible to select for the preferential direction of rotation a direction of the screw thread or pitch which is capable of at least partially balancing these axial efforts by means of the inherent weight of the reduction gearing itself, and vice versa.

Possibly, the case of this reduction gearing may carry a relatively long, double reaction arm bearing with its ends against fixed bearing points through the medium of elastic pads or the like.

However, other features and advantages of the present device will appear as the following description of a few possible forms of embodiment proceeds. This description is given by way of example and illustration with reference to the attached drawings:

FIG. 3 is a sectional view of the same assembly but taken along a plane containing the axis of the slow shaft to be driven, which is perpendicular to the axes of the pair of driving worms of the main reduction gearing;

FIG. 4 is a plane view from above of the assembly;

FIG. 5 is a side elevational view of the gearing system mounted in a tank or like vessel equipped with a mixing or stirring device having its shaft driven by said gearing;

FIG. 7 is a side elevational view of another modified form of embodiment of the invention.

Figure 1:
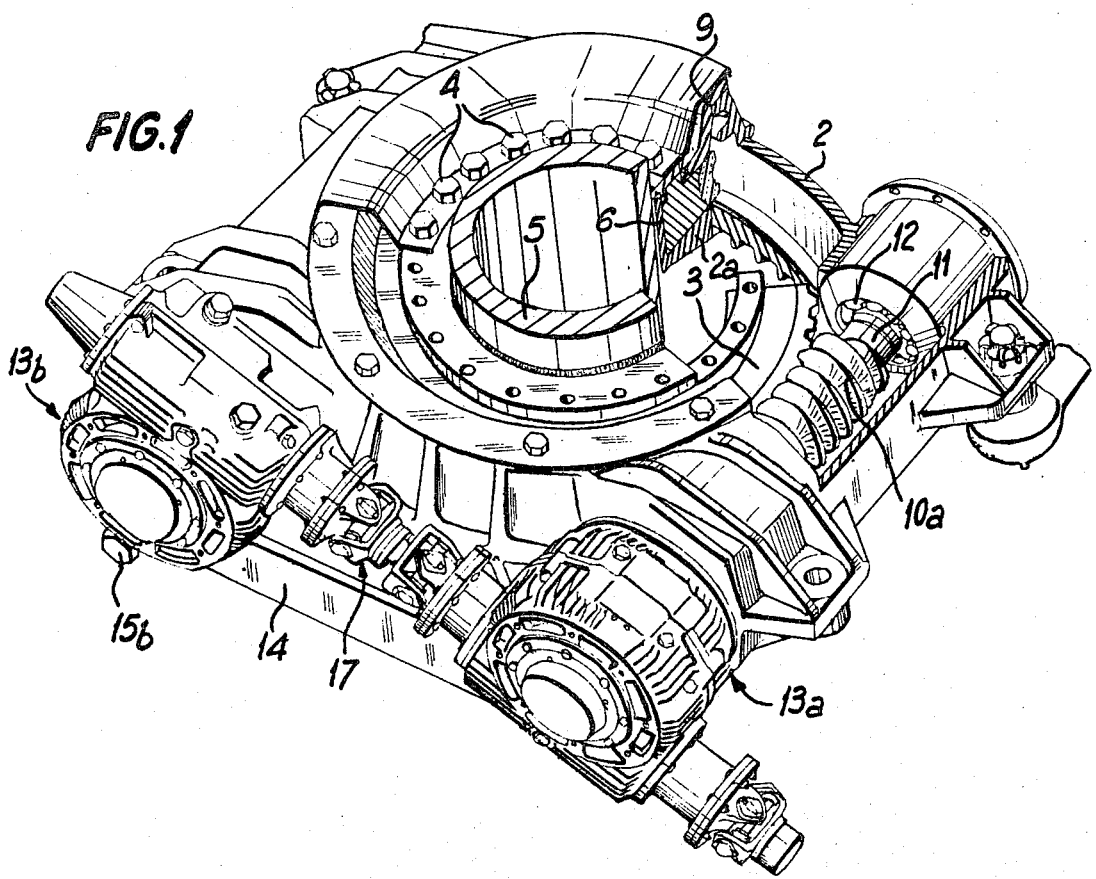
FIG. 1 is a perspective view of a driving assembly according to this invention.

The device illustrated in FIGS. 1 to 4 of the drawings is adapted to drive a vertical shaft 1 at a relatively slow speed. To this end, it comprises a main reduction worm gearing 2 having its driven toothed crown wheel 3 assembled with a hub 5 by means of bolts 4, said hub 5 being adapted to be fastened to the shaft 1 to be driven.

This hub 5 journalled in the case 2 is centered by the tubular bearing 6 rigid with said case or with a lower cover 2a thereof. This bearing constitutes a radial bearing of which the radial plane is coincident with that of said crown wheel. Thus, a single radial bearing is provided for centering the crown wheel, in lieu of two disposed on either side thereof. This is made possible by the very design of the device of this invention.

The crown wheel position is determined in the axial direction by a pair of annular bearings 7, 8 disposed on either side thereof. These bearings may be carried by the lower cover 2a of the case and by its upper cover 9, respectively. These bearings provide an accurate axial position of the toothed wheel 3 in relation to the case 2 and cover 9.

The crown wheel 3 is driven by means of a pair of worms 10a and 10b disposed on either side thereof and in diametrically opposed positions. The ends of the worm shafts 11 are fitted in bearings 12 carried externally of said case 2.

In combination with the main reduction gearing 2 the device of this invention comprises a pair of primary reduction gearings 13a, 13b each adapted to drive the shaft of one of said worms 10a, 10b of the main reduction gearing. To this end, the driven crown wheel of each one of these primary reduction gearings is secured to the end of the shaft of the corresponding worm of the main reduction gearing. However, the gear cases of these two primary reduction gearings 13a, 13b are adapted to "float," i.e., free, not rigid with respect to a fixed support. Therefore, they can revolve about the axes of worms 10a or 10b. However, the cases of these two reduction gearings are interconnected by a tie-bar 14 pivoted its two ends at 15a or 15b to lugs carried by said cases. The shafts 16a and 16b of the worms of these two primary reduction gearings 13a, 13b are interconnected by a coupling device capable of accomodating a certain angular misalignment with each other, for example a universal joint 17.

If desired, primary reduction gearings 13a and 13b of the same type, of which the worms have the same left-hand or righ-hand pitch, may be used. However, in this case these two reduction gearings must be mounted in opposite directions as shown in FIGS. 1 to 4, illustrating the fact that the worm of reduction gearing 13a is located beneath the relevant crown wheel and the worm of reduction gearing 13b is located above said wheel. With this specific arrangement it is possible to dispose the tie-bar 14 in a horizontal plane. In fact, this tie-bar 14 must compulsorily extend at right angles to the axis of crown wheel 3 of the main reduction gearing.

However, as illustrated in FIG. 7, it is also possible to mount the primary driving reduction gearings in the same direction, provided that primary reduction gearings 13c and 13d having worms with opposite pitches are used. As in the preceding case, the shafts 16c and 16d of the worms of these two reduction gearings are coupled through suitable devices accomodating a certain angular misalignment therebetween. This device may comprise an intermediate shaft 18 coupled to both shafts 16c and 16d by means of a pair of universal joints 17c and 17d. Finally, the cases of the two primary reduction gearings 13c and 13d are interconnected by a tie-bar 14 having its ends pivotally attached to said cases, respectively.

The input shafts of the two primary reduction gearings 13a and 13b are driven from a motor 19 of which the inherent weight may be supported by an elastic suspension rod 20 pivoted at 21 to a member adapted to carry same.

Preferably, the case 2 of the main reduction gearing carries a double reaction arm comprising two sections 22 extending on either side thereof in a plane perpendicular to the axis of crown wheel 3.

Each one of these arms terminates with a fork 23 surrounding a fixed stop member 24 and engaging this stop member through a plurality of elastic pads or blocks 25 (see FIG. 3).

The main reduction gearing of the present device constitutes one of the bearings of the slow shaft 1 to be driven. In this case, the other bearing necessary for mounting this shaft may be disposed on one or the other side in relation to this reduction gearing. Thus, FIG. 4 illustrates a typical application of this reduction gearing for driving the slow-rotating shaft of a mixer disposed within a vessel or tank 26.

Now, in this example, the other bearing of shaft 1 is a foot-step bearing 27 disposed in the bottom of the tank 26. In this case the shaft 1 carries an arm 28 provided with blades 29 or other mixing elements. Of course this example is given simply by way of illustration, not of limitation, for it will readily occur to those conversant with the art that the reduction gearing of this invention is applicable to many machines and systems.

With the arrangement contemplated, the load constituted by the stress supported by the pair of primary reduction gearings 13a and 13b is equally distributed. This distribution takes place automatically for the cases of these reduction gearings are mounted in the well-known floating fashion and simply interconnected by the tie-bar 14 acting as a "reaction bar." These reduction gearing are thus caused to be held against motion in positions ensuring an equal distribution of the stress among them.

This makes it possible to reduce appreciably the stress supported by the bearings, for the gear meshing reactions are fairly balanced. Consequently, the toothed crown wheel 3 can be journalled in the case by means of, and on, a single radial bearing 6 disposed in the median plane of this wheel and extending substantially on either side of this plane.

However, it is also possible to have this crown wheel journalled in a rolling-contact thrust bearing of adequate type substituted for both said radial bearing 6 and said axial bearings 7 and 8. Thus, this thrust bearing may be disposed even outside the median plane X—X' of the crown wheel.

Figure 6:
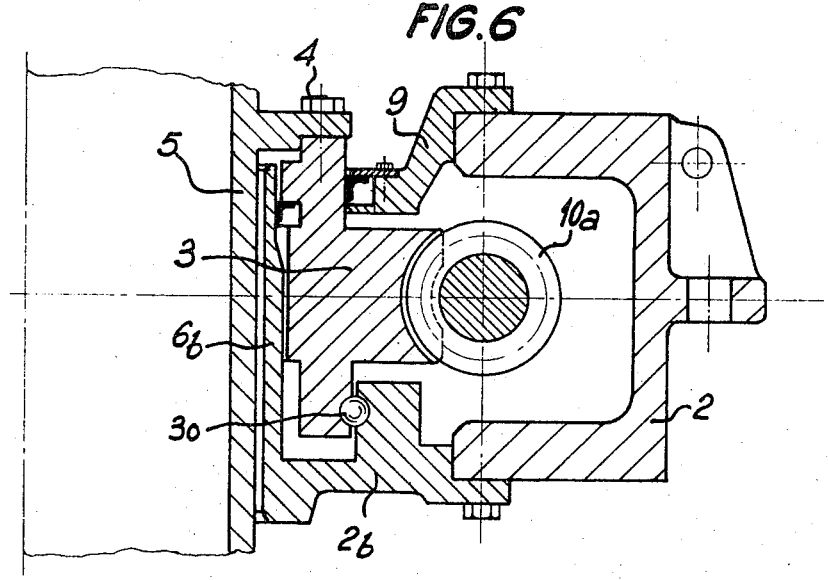
FIG. 6 is a fragmentary section similar to FIG. 2 showing a modified form of embodiment.
Figure 2:
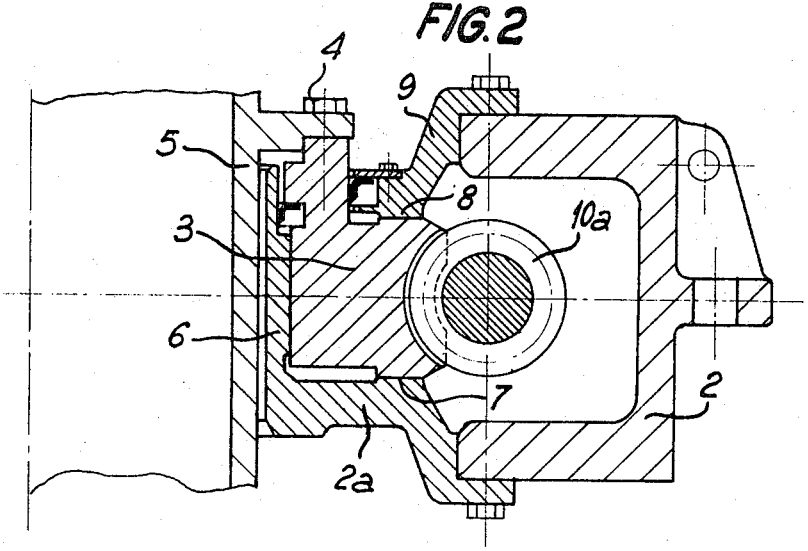
FIG. 2 is a fragmentary section of FIG. 1.

In this connection, FIG. 6 illustrates a modified form of embodiment of the invention which is consistent with this specific structure, wherein the corresponding crown wheel 3b is journalled in the case 2 through the medium of a ball thrust bearing 30 supporting this crown wheel. If desired, this thrust bearing may be supported by the lower cover 2b of the corresponding case. In this case, a certain clearance may be provided around the tubular body 6b carried by said cover and having the crown wheel 3 mounted concentrically thereto.

Of course, the reaction bar 14 interconnecting the cases of the pair of primary reduction gearings 13a and 13b may comprise any suitable auxiliary means such as stress measuring devices and/or safety devices.

The weight of the various component elements of the present device may be supported by static thrust bearings located either under the cases of said reduction gearings or under the reaction arm 22, or under the elastic pads 25. The driven shaft may if desired have an upper extension and comprise at its upper end a thrust bearing fitted in a fixed frame structure or the like. If necessary, the position of this thrust bearing may be adjustable in the vertical or axial direction by means of hydraulic or pneumatic cylinders in order to move the assembly bodily. In this case, the forks 23 provided at the ends of the reaction arms 22 are caused to slide along uprights 24 constituting the bearing elements of these arms.

Of course, the driving device of this invention may be used for any suitable applications.

Thus, in this respect it may be added that the use of this device should not be construed as being strictly limited to the driving of a vertical shaft as illustrated in the drawings. In fact, it can be used to advantage for driving a horizontal shaft or a shaft having any other desired angular position to the vertical.

What we claim is:

1. A reduction gearing device for rotatably driving a shaft from a rotary motor shaft, which comprises in combination:

a. a main worm gearing comprising:
    a case,
    a toothed crown wheel rotatably mounted in said case and adapted to be drivingly connected to the shaft to be driven,
    a pair of worms rotatably mounted in the saem case and in constant meshing engagement with said toothed crown wheel, said worms being disposed at diametrally opposed locations in relation to said crown wheel,
b. a pair of primary worm gearings each adapted to drive one of said main reduction gearing worms, and comprising each:
   a driven toothed wheel rotatably rigid with the corresponding worm,
   a driving worm meshing with said toothed wheel, and a freely mounted case without any means for anchoring same to a fixed point,
c. a tie-bar having its ends pivoted to the cases of said pair of primary worm gearings, and
d. means for coupling the worm shafts of said pair of primary worm gearings to each other, said coupling means being adapted to accomodate a certain angular misalignment between said worm shafts.

2. A reduction gearing as set forth in claim 1, wherein the driven crown wheel is journalled in the case by means of a single radial bearing located substantially in the median place of said crown wheel.

3. A reduction gearing as set forth in claim 1, wherein said driven crown wheel is journalled in the case by means of a rolling-contact thrust bearing.

4. A reduction gearing as set forth in claim 1, wherein said case carries two holding arms reacting at their ends on fixed stop member through the medium of elastic pads.

* * * * *